(12) United States Patent
Bergo et al.

(10) Patent No.: US 6,718,222 B2
(45) Date of Patent: Apr. 6, 2004

(54) AUTOMATIC MACHINE FOR PROCESSING CIGARETTES

(75) Inventors: Daniele Bergo, Bologna (IT); Roberto Campanini, Bologna (IT); Mario Spatafora, Bologna (IT)

(73) Assignee: G. D Societa' per Azioni, Bologna (IT)

( * ) Notice: Subject to any disclaimer, the term of this patent is extended or adjusted under 35 U.S.C. 154(b) by 79 days.

(21) Appl. No.: 10/071,258

(22) Filed: Feb. 8, 2002

(65) Prior Publication Data

US 2002/0117179 A1 Aug. 29, 2002

(30) Foreign Application Priority Data

Feb. 12, 2001 (IT) .................... BO2001A0073

(51) Int. Cl.[7] .................. G06F 19/00; G01M 13/00; A24C 5/00
(52) U.S. Cl. ................... 700/117; 131/280; 702/113; 702/116; 702/184
(58) Field of Search ............. 131/280; 700/83, 700/95, 117, 180, 275; 702/113, 116, 117, 119, 123, 183, 184; 493/37; 324/500, 512, 555

(56) References Cited

U.S. PATENT DOCUMENTS

| | | | |
|---|---|---|---|
| 3,731,043 A | 5/1973 | Ullmann et al. ......... 219/69.12 |
| 4,558,557 A | 12/1985 | Kuehfuss ..................... 53/506 |
| 4,653,003 A * | 3/1987 | Kirstein ....................... 701/29 |
| 4,724,429 A * | 2/1988 | Millen et al. ............... 340/679 |
| 5,284,164 A * | 2/1994 | Andrews et al. ............ 131/280 |
| 5,877,961 A * | 3/1999 | Moore ........................ 700/180 |
| 6,202,003 B1 * | 3/2001 | Niwa ........................ 700/192 |

FOREIGN PATENT DOCUMENTS

| | | |
|---|---|---|
| EP | 0023824 | 2/1981 |
| EP | 0195524 | 9/1986 |
| EP | 0847925 | 6/1998 |
| EP | 0963913 | 12/1999 |

OTHER PUBLICATIONS

English Abstract of EP 0847925 dated Jun. 17, 1998.

* cited by examiner

*Primary Examiner*—Leo Picard
*Assistant Examiner*—Paul Rodriguez
(74) *Attorney, Agent, or Firm*—Ladas & Parry

(57) ABSTRACT

An automatic machine for processing cigarettes, whereby a control device, which can be activated when the machine is stopped, activates at least one test operating member as of a rest condition and substantially independently of the other operating members; the control device also providing for restoring the test operating member to the rest condition following activation.

93 Claims, 4 Drawing Sheets

AUTOMATIC MACHINE FOR PROCESSING CIGARETTES

The present invention relates to an automatic machine for processing cigarettes.

BACKGROUND OF THE INVENTION

Currently used automatic cigarette processing machines are extremely complex both mechanically and electronically. In recent years, conventional drives with transmissions powered by a main motor have been replaced with a number of independent drives, each synchronized with the others. Also, to improve product quality, increasingly sophisticated controls have been introduced, both of the product itself (e.g. optical control using television cameras) and the process (e.g. heat-seal temperature control using temperature sensors, wrapping material supply control, etc.).

The increasing use of electronics in the control of automatic machines now means that, alongside mechanical setup and maintenance (i.e. of the mechanical components of the machine)—which, though simpler than before, are still necessary—electrical setup and maintenance (i.e. of the electrical and electronic components of the machine) are also required.

The electrical setup of known automatic cigarette processing machines, however, is an extremely complex, time-consuming job, on account of individual operating members—e.g. electric motors, sensors, solenoid valves—still having to be tested by operating the whole or at least a whole section of the automatic machine, and so being compared with simultaneous operation of a large number of other operating members.

To overcome the above drawback, it has been proposed to bypass the automatic machine control program by physically forcing certain states of the automatic machine controller to determine the response of a given operating member. Such a procedure, however, is not actually employed, by being not only difficult to perform but also extremely dangerous by failing to conform with the minimum standards governing both machine and operator safety.

SUMMARY OF THE INVENTION

It is an object of the invention to provide an automatic machine for processing cigarettes designed to eliminate the aforementioned drawbacks, and which at the same time is cheap and easy to implement.

According to the present invention, there is provided an automatic machine for processing cigarettes as recited by claim 1.

BRIEF DESCRIPTION OF THE DRAWINGS

A number of non-limiting embodiments of the present invention will be described by way of example with reference to the accompanying drawings, in which.

DETAILED DESCRIPTION OF THE INVENTION

Figure 1:
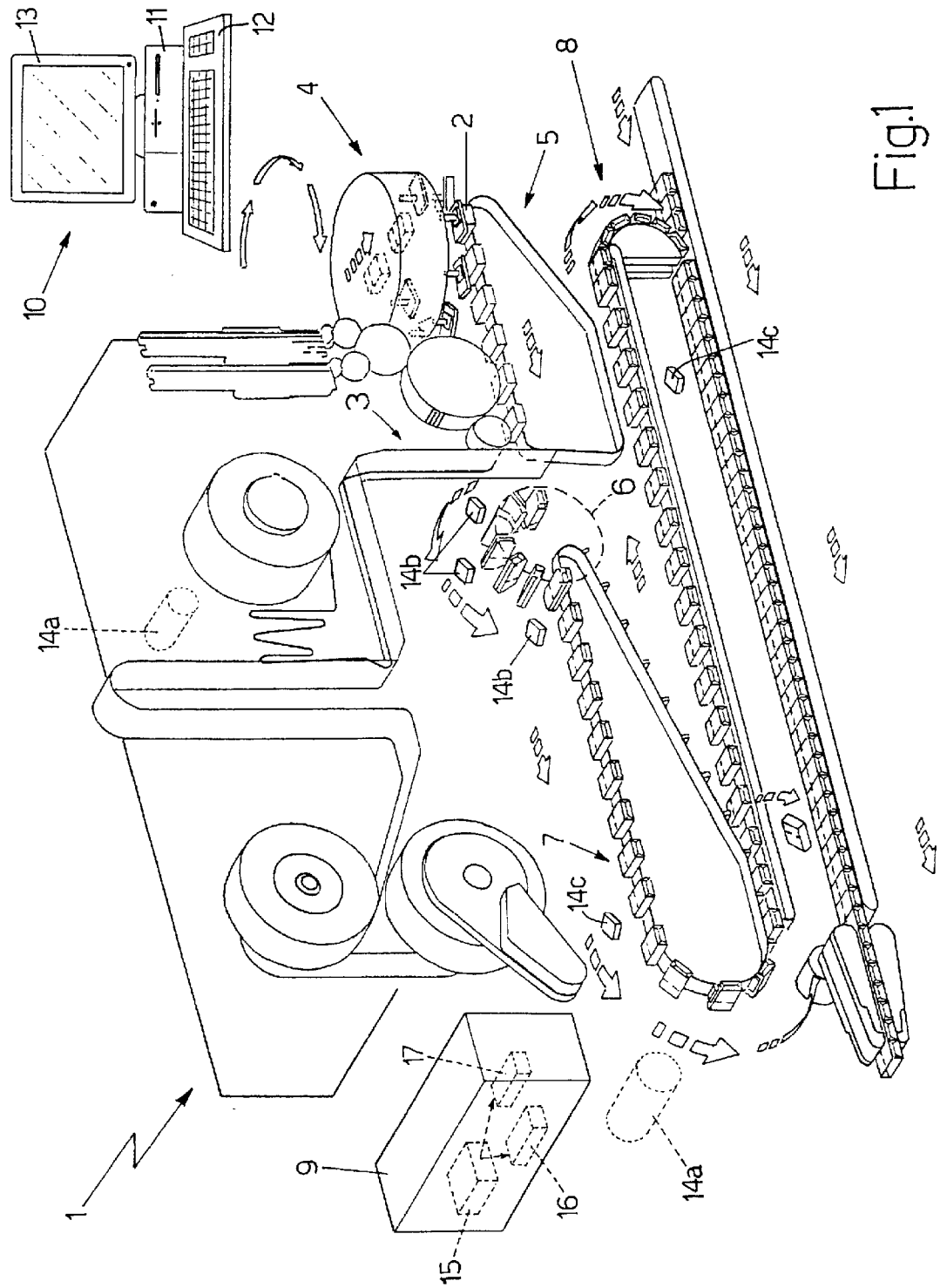
FIG. 1 shows a schematic view in perspective of an automatic machine in accordance with the present invention and for overwrapping packets of cigarettes.

Number 1 in FIG. 1 indicates as a whole a known automatic machine (in particular, a "C800" machine produced by the G. D company) for overwrapping packets 2 of cigarettes in respective sheets 3 of transparent plastic material.

Machine 1 comprises an input conveyor 4 for transferring packets 2 to a belt conveyor 5, which feeds packets 2, together with respective sheets 3, onto a wrapping wheel 6 where tubular wrappings are formed and stabilized by on-edge heat sealing sheets 3 about respective packets 2. From wheel 6, the tubular wrappings are transferred to a second belt conveyor 7, which feeds the tubular wrappings along a path along which sheets 3 are finish folded about respective packets 2 and stabilized by heat sealing the ends. From belt conveyor 7, the packets 2 overwrapped in respective sheets 3 are transferred to a drying conveyor 8 for subsequent supply to an automatic cartoning machine (not shown in FIG. 1).

Machine 1 also comprises a control unit 9 connected to an interface (or so-called HMI) device 10 allowing the operator to interact with control unit 9. Interface device 10 comprises an industrial personal computer 11; an input device 12 (typically a keyboard and/or pointing device) by which the operator transmits commands to control unit 9; and a screen 13 by which control unit 9 displays information. In a preferred embodiment, screen 13 is also provided with a touch-screen device for simplifying command input by the operator as an alternative to input device 12.

Machine 1 also comprises a number of known operating members 14a, 14b, 14c (shown schematically) for performing respective functions when activated by control unit 9, and wherein operating members 14a, for example, are electric motors 14b are, solenoid valves and 14c are sensors.

Control unit 9 comprises a program 15 for controlling automatic machine 1 and implementing a main application program 16 or controlling normal operation of automatic machine 1, and a test application program 17 for testing automatic machine 1. As of a machine stop condition in which each operating member is deactivated in a respective rest condition, the operator can select, by means of interface device 10, whether to perform main application program 16 or test application 17. Main application program 16 activates operating members 14a, 14b, 14c in substantially coordinated manner to overwrap packets 2, while test application program 17 activates one test operating member substantially independently of the other operating members.

For the operator to launch test application program 17, automatic machine 1 must be set to the machine stop condition, wherein each operating member is in a respective rest condition.

Figure 2:
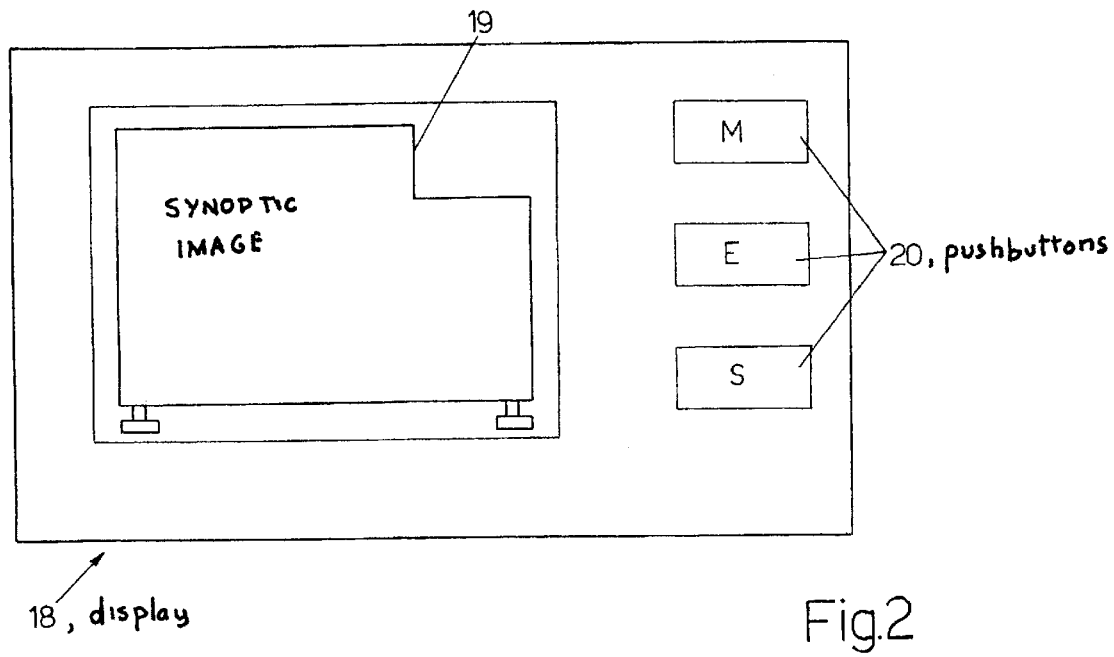
FIGS. 2–6 show, schematically, a number of displays by a user interface device of the automatic machine in FIG. 1.

When test application program 17 is launched, screen 13 shows an introductory display 18 (FIG. 2) showing a synoptic image 19 (shown schematically) of automatic machine 1, and three push-buttons 20 by which the operator selects the type of operating member 14a, 14b, 14c for testing. More specifically, the push-button 20 indicated M selects electric motors 14a, the push-button 20 indicated E selects solenoid valves 14b, and the push-button 20 indicated S selects sensors 14c.

When one of push-buttons 20 is selected by the operator, introductory display 18 switches to a selection display 21a, 21b (FIGS. 3 and 5) from which to select the operating member or group of operating members for testing. That is, each selection display 21a, 21b shows another synoptic image 22 of automatic machine 1, and a number of icons 23, each representing a respective operating member 14a, 14b, 14c and superimposed on synoptic image 22, substantially at the actual location of the respective operating member.

Figure 3:
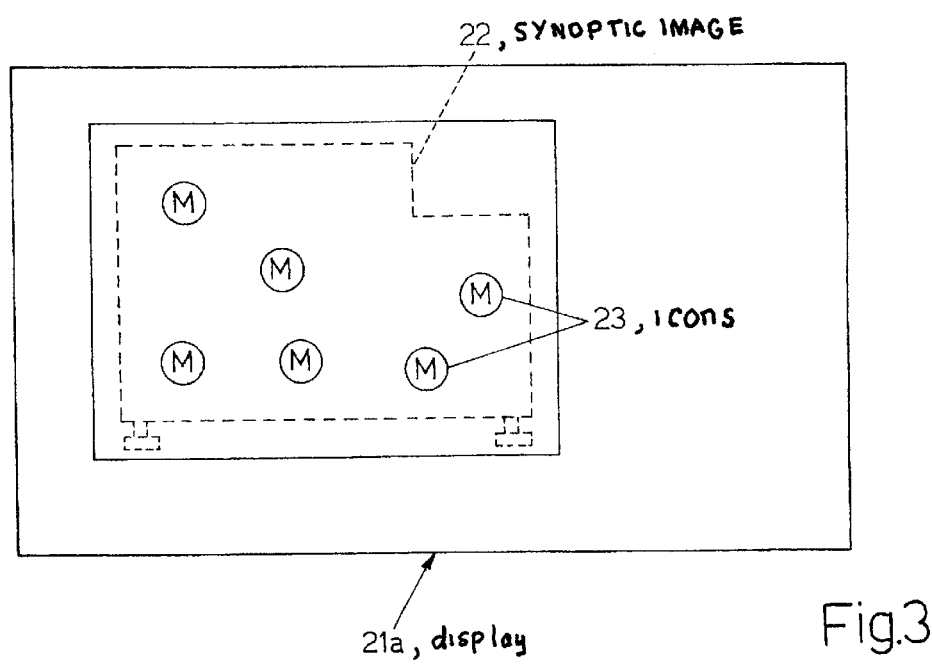

FIG. 3 shows the selection display 21a relative to electric motors 14a, which is accessed using the push-button 20 indicated M, and which shows a number of icons 23, each representing a respective electric motor 14a. When an icon 23, i.e. a respective test electric motor 14a, is selected in known manner, the screen switches to an activation display 24a (FIG. 4) by which to activate the test electric motor 14a.

Figure 5:
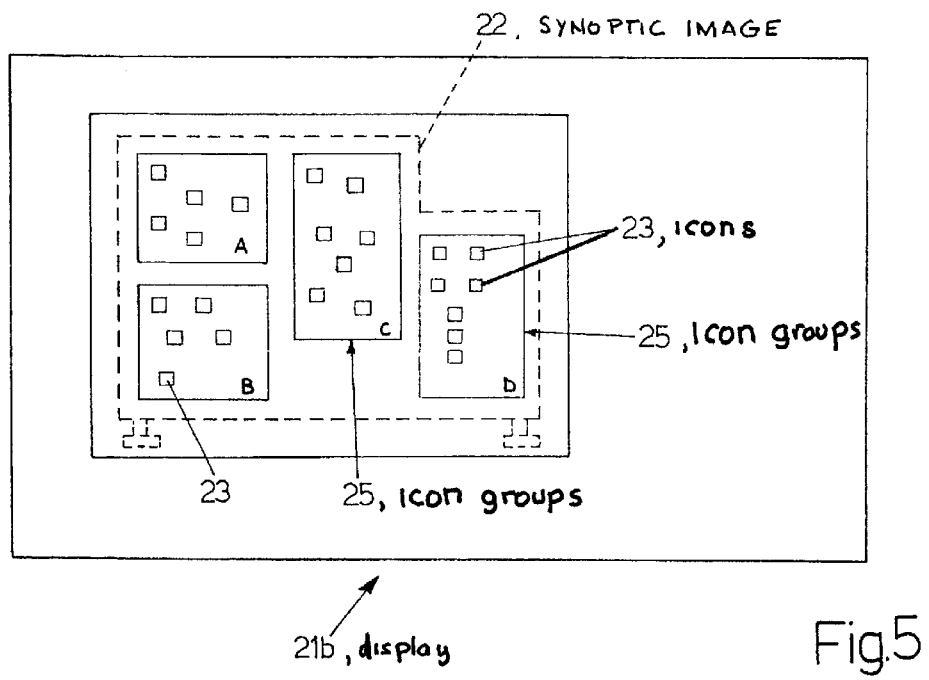

FIG. 5 shows the selection display 21b relative to solenoid valves 14b, which is accessed using the push-button 20 indicated E, and which shows a number of icons 23 arranged in operator-selectable groups 25 and each representing a respective solenoid valve 14b. When a group 25 of icons 23, i.e. respective test solenoid valves 14b, is selected by the operator in known manner, the screen switches to an activation display 24b (FIG. 6) by which to activate the test solenoid valves 14b.

When the push-button 20 indicated S is selected by the operator, the screen shows a selection display (not shown) graphically identical with selection display 21b in FIG. 5 and by which to select a group of sensors 14c. When a group of test sensors 14c is selected by the operator, screen 13 switches to an activation display (not shown) graphically identical with activation display 24b and by which to activate the test sensors 14c.

Whether an electric motor, solenoid valve or sensor is selected, before allowing access to the activation display, test application program 17 memorizes the rest condition of each operating member in a known memory (not shown) of computer 11, so that, at the end of the test stage conducted by the operator using the activation display, each operating member activated at the test stage can be restored to the respective rest condition by test application program 17. More specifically, test application program 17 may decide whether or not each operating member 14a, 14b, 14c is to be restored to the respective pretest rest condition.

Moreover, before allowing access to the respective activation display, test application program 17 determines whether individual activation of the test operating member may possibly interfere with other operating members, i.e. may possibly endanger automatic machine 1, and, if so, disables individual activation until the potential source of interference is eliminated. For example, interference between two operating members may be manifested in one operating member mechanically penetrating the other in given positions.

In general, any of the operating members which may possibly interfere with individual activation of the test operating member are activated independently by test application program 17, so as to be set temporarily to positions in which they do not interfere with individual activation of the test operating member. Following individual activation of the test operating member, test application program 17 restores all the operating members 14a, 14b, 14c to the respective rest conditions.

Alternatively, test application program 17 indicates any interference on screen 13, and waits for the operator to eliminate the interference manually.

For the operator to activate the test operating member or group of members, each activation display shows graphic control and monitoring tools allowing the operator to select the preferred operating pattern, and determine the response of the operating member.

Figure 4:
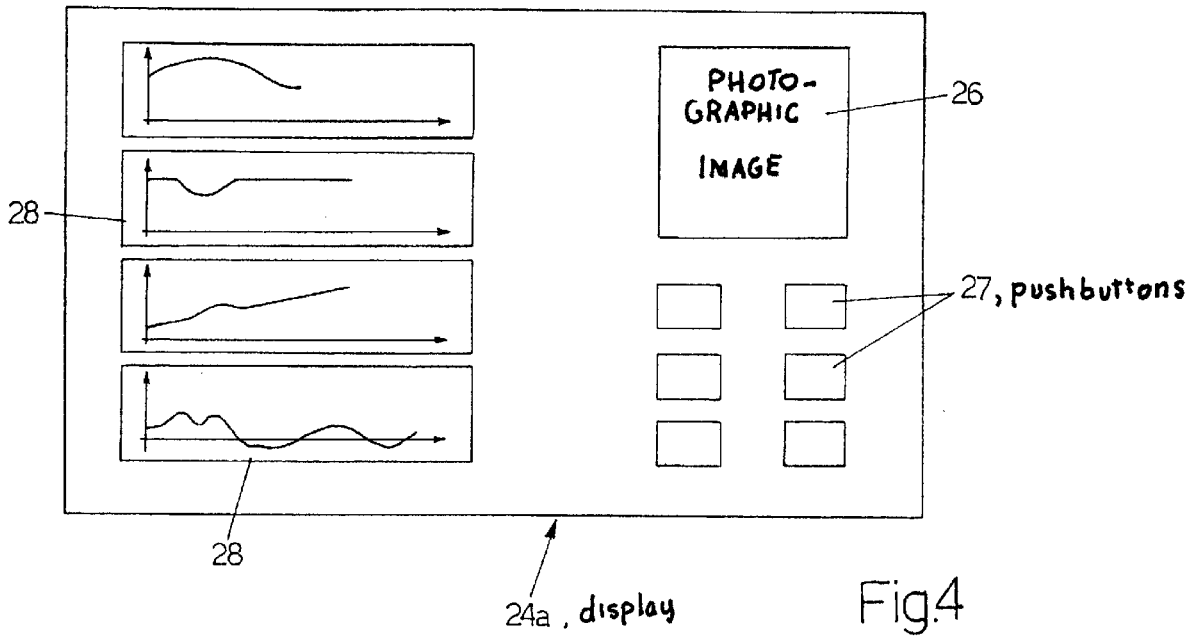

The activation display 24a of an electric motor 14a in FIG. 4 shows a photographic image 26 of the test electric motor 14a; a number of push-buttons 27 for activating the motor; and time graphs 28 of various reference quantities of test electric motor 14a, such as output torque, angular position, speed, and tracking error.

By means of push-buttons 27, the operator can activate test electric motor 14a to a given operating pattern. For example, the operator may select to activate test electric motor 14a to the same operating pattern as during normal operation of automatic machine 1; may set and maintain a given angular position of test electric motor 14a; or may choose to set test electric motor 14a to a constant rotation speed. Using push-buttons 27, the operator may also set the direction, stage and performance speed of the operating pattern of test electric motor 14a.

In an alternative embodiment, the performance speed of the operating pattern of test electric motor 14a is regulated by the operator using a known manually operated potentiometer (not shown) housed on automatic machine 1 or in control unit 9.

Figure 6:
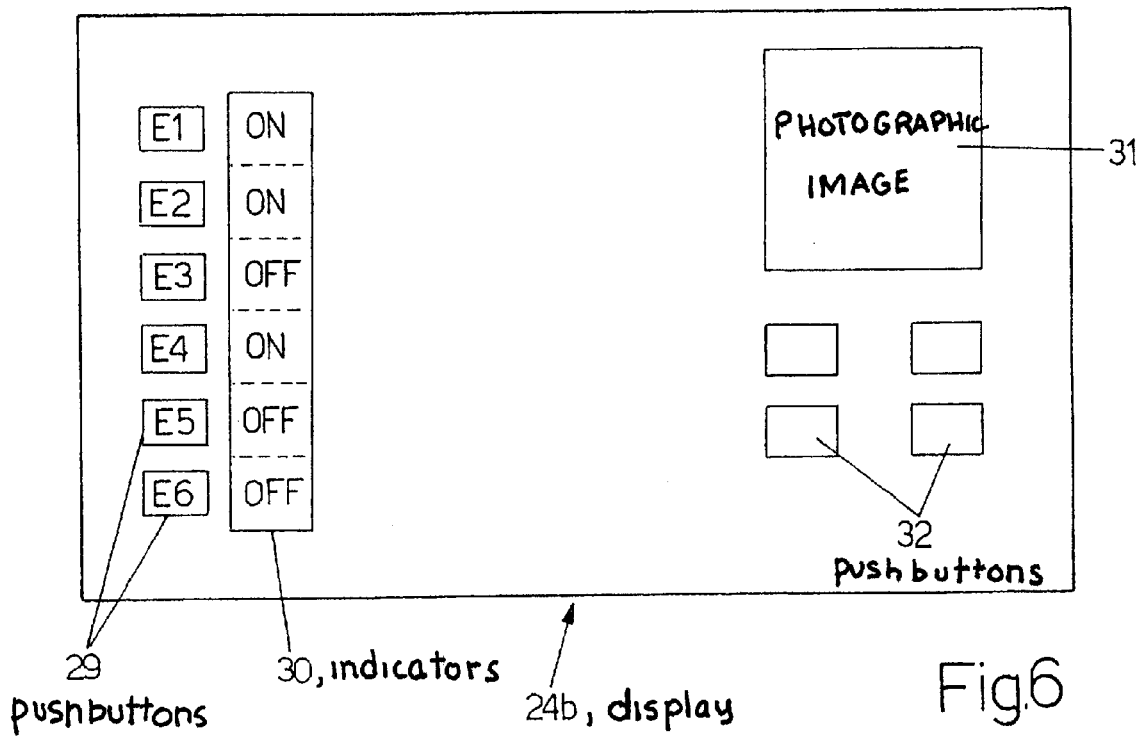

The activation display 24b of a solenoid valve 14b in FIG. 6 shows a list of push-buttons 29, each for selecting a respective test solenoid valve 14b, and each assigned a respective indicator 30 showing the state of the corresponding solenoid valve 14b.

Display 24b also comprises a photographic image 31 of the test solenoid valve 14b selected by respective push-button 29; and a number of push-buttons 32 allowing the operator to activate the solenoid valve 14b to a given operating pattern. For example, the operator may choose to activate the test solenoid valve 14b to the same operating pattern as during normal operation of automatic machine 1; may set and maintain a given condition of test solenoid valve 14b; or may choose to switch test solenoid valve 14b periodically at adjustable frequency.

The activation display (not shown) of a sensor 14c is graphically similar to activation display 24b of a solenoid valve 14b, and provides for setting a test sensor 14c to a read condition, and for memorizing and displaying any changes, during testing, in the output value of test sensor 14c.

In an alternative embodiment, the operator may also launch test application program 17 during normal operation of automatic machine 1. In this case, however, control push-buttons 27 and 32 are all disabled to prevent the operator from activating any of operating members 14, only the states of which can be observed, e.g. by means of indicators 30 or graphs 28.

Test application program 17 therefore allows the operator to activate an individual test operating member as of a rest condition and substantially independently of the other operating member. And, following activation of the test operating member as specified by the operator, test application program 17 provides independently and automatically for restoring the test operating member to the respective rest condition.

The efficiency of each operating member can thus be tested in the utmost safety, as regards bot the operator and automatic machine 1. Moreover, after testing, automatic machine 1 is restored to the same condition as before, thus safeguarding against any mishaps when automatic machine 1 is started bu again.

In a further embodiment not shown, test application program 17 advantageously provides for activating certain test operating members in a given section of automatic machine 1 substantially independently of the other operating members in the same section. For example, two or more test motors 14a for unwinding and feeding a web of wrapping material may be activated.

Figure 7:
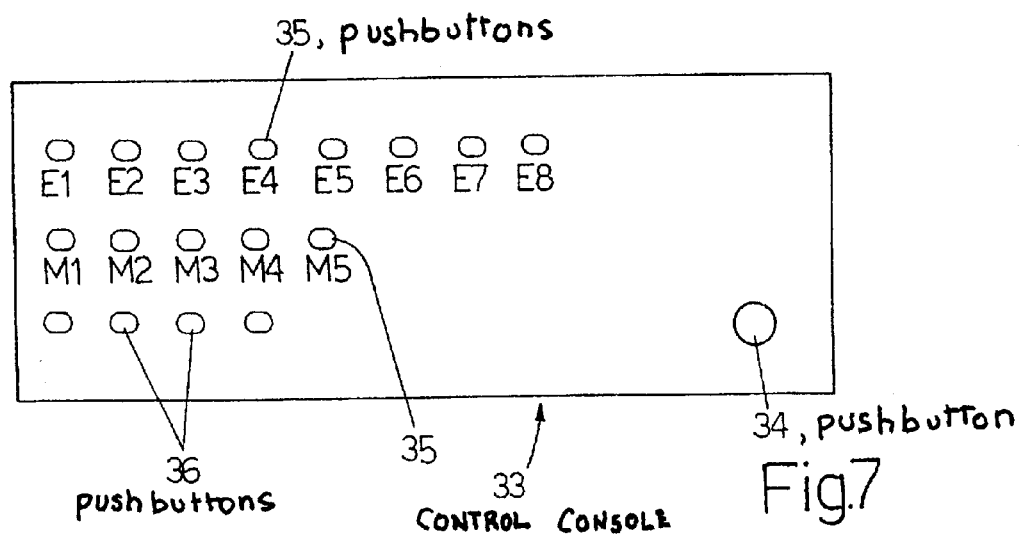
FIG. 7 shows a control console of an alternative embodiment of the automatic machine in FIG. 1.

FIG. 7 shows an alternative embodiment in which to employ test application program 17.

Interface device 10 is replaced by a control console 33, which is normally housed close to automatic machine 1 and comprises a key-protected activation push-button 34 for only launching test application program 17 when automatic machine 1 is in the machine stop condition.

To test an operating member as described previously, console 33 comprises a number of push-bottons 35 for selecting the test operating member (in particular, an electric motor 14a or solenoid valve 14b); and a number of push-buttons and/or potentiometers 36 for controlling activation of the selected test operating member.

What is claimed is:

1. An automatic machine for processing cigarettes, the automatic machine comprising a number of operating members, and first control means for setting the automatic machine to an operating condition wherein the operating members are activated coordinatedly to process the cigarettes, or to a machine stop condition wherein substantially each operating member is deactivated in a respective rest condition; the machine further comprising second control means for activating and running at least one said operating member to be tested from the respective rest condition and substantially independently of the other operating members.

2. A machine as claimed in claim 1, wherein the second control means provides for memorizing said rest condition of said at least one operating member before activating said at least one operating member; and for restoring said at least one operating member to the respective rest condition following activation.

3. A machine as claimed in claim 1, and further comprising a control unit, and an interface device allowing an operator to interact with the control unit; the control unit comprising a control program implementing said first and said second control means.

4. A machine as claimed in claim 1, wherein said second control means provides for activating some of said operating members in a given section of the automatic machine substantially independently of the other said operating members in the same section of the automatic machine.

5. A machine as claimed in claim 1, wherein said second control means are is able to memorize said rest condition of said at least one operating member before activating the-test said at least one operating member, and to restore said at least one operating member to the respective rest condition following activation.

6. A machine as claimed in claim 1, wherein said second control means is able to determine, prior to individually activating said at least one operating member, whether activation of said at least one operating member may possibly interfere with other said operating members.

7. A machine as claimed in claim 6, wherein said second control means is able to disable individual activation of said at least one operating member in the event individual activation may possibly interfere with other said operating members.

8. A machine as claimed in claim 7, wherein said second control means is able to activate the operating members possibly interfering with individual activation of said at least one operating member in such a manner as to set such operating members to a temporary position involving no possible interference with individual activation of said test at least one operating member.

9. A machine as claimed in claim 8, wherein said second control means is able to memorize said rest condition of each said operating member possibly interfering with said test at least one operating member; and restoring each said operating member to the respective rest condition following said activation of said at least one operating member.

10. A machine as claimed in claim 1, wherein said second control means is able to activate said test at least one operating member to an operating pattern user-selectable by means of a user interface device connected to the automatic machine.

11. A machine as claimed in claim 10, wherein direction, stage and/or performance speed of said operating pattern are user-selectable by means of said user interface device.

12. A machine as claimed in claim 10, wherein performance speed of said operating pattern is user-selectable by means of a manually operated potentiometer.

13. A machine as claimed in claim 10, wherein said operating pattern is the same as an operating pattern of said at least one operating member during normal operation of the automatic machine.

14. A machine as claimed in claim 10, wherein said operating pattern provides for setting and maintaining said test at least one operating member in a given condition.

15. A machine as claimed in claim 10, wherein said operating pattern provides for setting said at least one operating member to a read condition when said test at least one operating member is a sensor.

16. A machine as claimed in claim 15, comprising means for memorizing and displaying any changes in the output value of said sensor.

17. A machine as claimed in claim 1, and further comprising a user interface device connected to the automatic machine for displaying the state or time development of at least one reference quantity relative to said at least one operating member.

18. A machine as claimed in claim 17, wherein said user interface device is able to display an output torque value, an angular position value, a speed value and a tracking error value, when said at least one operating member is an electric motor.

19. A machine as claimed in claim 17, wherein said user interface device is able to display the a state, when said at least one operating member is a solenoid valve.

20. A machine as claimed in claim 17, wherein said user interface device is able to display an output value, when said at least one operating member is a sensor.

21. A machine as claimed in claim 1, wherein a user interface device is able to display a synoptic image of the automatic machine by means of a user interface device connected to the automatic machine; icons representing at least some of said operating members being displayed on said synoptic image to permit user selection of said at least one operating member.

22. A machine as claimed in claim 21, wherein each said icon is displayed on said synoptic image at an actual location of the respective operating member.

23. A machine as claimed in claim 21, wherein the type of operating members for display in conjunction with said synoptic image is user-selectable.

24. A machine as claimed in claim 1, wherein said second control means is able to activate some of said operating members in a given section of the automatic machine substantially independently of the other of said operating members in the same section of the automatic machine.

25. A machine as claimed in claim 1, wherein when said at least one operating member is activated and running for being tested, said second means maintains other of said operating member at rest.

26. An automatic machine for processing cigarettes, the automatic machine comprising a number of operating members, and first control means for setting the automatic machine to an operating condition wherein the operating members are activated coordinatedly to process the cigarettes, or to a machine stop condition wherein substantially each operating member is deactivated in a respective rest condition; the machine further comprising second control means for activating at least one said operating member as a test operating member as of its respective rest condition and substantially independently of other of said operating members; the second control means providing for memorizing said rest condition of said test operating member before activating the test operating member, and for restoring the test operating member to the respective rest condition following activation.

27. A machine as claimed in claim 26, and further comprising a control unit, and an interface device allowing an operator to interact with the control unit; the control unit comprising a control program implementing said first and said second control means.

28. A machine as claimed in claim 26, wherein said second control means provides for activating a plurality of test operating members in a given section of the automatic machine substantially independently of other operating members in the same section of the automatic machine.

29. A machine as claimed in claim 26, wherein said second control means is able to determine, prior to individually activating said test operating member, whether activation of said test operating member may interfere with other said operating members.

30. A machine as claimed in claim 29, wherein said second control means are able to disable individual activation of any said test operating member in the event individual activation may interfere with other operating members.

31. A machine as claimed in claim 30, wherein said second control means is able to activate the operating members interfering with individual activation of said test operating member in such a manner as to set such operating members to a temporary position involving no possible interference with individual activation of said test operating member.

32. A machine as claimed in claim 31, wherein said second control means is able to memorize said rest condition of each said operating member possibly interfering with said test operating member; and restoring each said operating member to the respective rest condition following said activation of the test operating member.

33. A machine as claimed in claim 26, wherein said second control means is able to activate the test operating member to an operating pattern user-selectable by means of a user interface device connected to the automatic machine.

34. A machine as claimed in claim 33, wherein a direction, a stage and/or a performance speed of said operating pattern are user-selectable by means of said user interface device.

35. A machine as claimed in claim 33, wherein a performance speed of said operating pattern is user-selectable by means of a manually operated potentiometer.

36. A machine as claimed in claim 33, wherein said operating pattern is the same as the operating pattern of said test operating member during normal operation of the automatic machine.

37. A machine as claimed in claim 33, wherein said operating pattern provides for setting and maintaining said test operating member in a given condition.

38. A machine as claimed in claim 33, wherein said operating pattern provides for setting said test operating member to a read condition when said test operating member is a sensor.

39. A machine as claimed in claim 38, further comprising means for memorizing and displaying any changes in the output value of said sensor.

40. A machine as claimed in claim 26, and further comprising a user interface device connected to the automatic machine for displaying a state or time development of at least one reference quantity relative to the test operating member.

41. A machine as claimed in claim 40, wherein said user interface device is able to display an output torque value, an angular position value, a speed value and a tracking error value, when said test operating member is an electric motor.

42. A machine as claimed in claim 40, wherein said user interface device is able to display the state, when said test operating member is a solenoid valve.

43. A machine as claimed in claim 40, wherein said user interface device is able to display an output value, when said test operating member is a sensor.

44. A machine as claimed in claim 26, wherein a user interface device is able to display a synoptic image of the automatic machine; icons representing at least some of said operating members being displayed on said synoptic image to permit user selection of said test operating member.

45. A machine as claimed in claim 44, wherein each said icon is displayed on said synoptic image at an actual location of the respective said operating member.

46. A machine as claimed in claim 44, wherein the type of operating members for display in conjunction with said synoptic image is user-selectable.

47. A machine as claimed in claim 26, wherein said second control means is able to activate at least some said test operating members in a given section of the automatic machine substantially independently of other said operating members in the same section of the automatic machine.

48. An automatic machine for processing cigarettes, the automatic machine comprising a number of operating members, and first control means for setting the automatic machine to an operating condition wherein the operating members are activated coordinatedly to process the cigarettes, or to a machine stop condition wherein substantially each operating member is deactivated in a respective rest condition; the machine further comprising second control means for activating at least one said operating member as a test operating member as of the respective rest condition and substantially independently of other said operating members; said second control means being able to determine, prior to individually activating the test operating member, whether activation of said test operating member may interfere with other said operating members.

49. A machine as claimed in claim 48, wherein the second control means provides for memorizing said rest condition of said test operating member before activating the test operating member; and for restoring the test operating member to the respective rest condition following activation.

50. A machine as claimed in claim 48, and further comprising a control unit, and an interface device allowing an operator to interact with the control unit; the control unit comprising a control program implementing said first and said second control means.

51. A machine as claimed in claim 48, wherein said second control means provides for activating at least some said test operating members in a given section of the automatic machine substantially independently of other said operating members in the same section of the automatic machine.

52. A machine as claimed in claim 51, wherein said second control means is able to memorize said rest condition of the test operating member before activating the test operating member, and to restore the test operating member to the respective rest condition following activation.

53. A machine as claimed in claim 48, wherein said second control means is able to disable individual activation of said test operating member in the event individual activation may interfere with other operating members.

54. A machine as claimed in claim 53, wherein said second control means is able to activate the operating members interfering with individual activation of said test operating member in such a manner as to set such operating members to a temporary position involving no possible interference with individual activation of said test operating member.

55. A machine as claimed in claim 54, wherein said second control means is able to memorize said rest condition of each said operating member interfering with said test operating member; and restoring each said operating member to the respective rest condition following said activation of a test operating member.

56. A machine as claimed in claim 48, wherein said second control means is able to activate a test operating member to an operating pattern user-selectable by means of a user interface device connected to the automatic machine.

57. A machine as claimed in claim 56, wherein a direction, a stage and/or a performance speed of said operating pattern are user-selectable by means of said user interface device.

58. A machine as claimed in claim 56, wherein a performance speed of said operating pattern is user-selectable by means of a manually operated potentiometer.

59. A machine as claimed in claim 56, wherein said operating pattern is the same as the operating pattern of said test operating member during normal operation of the automatic machine.

60. A machine as claimed in claim 56, wherein said operating pattern provides for setting and maintaining said test operating member in a given condition.

61. A machine as claimed in claim 56, wherein said operating pattern provides for setting said test operating member to a read condition when said test operating member is a sensor.

62. A machine as claimed in claim 61, comprising means for memorizing and displaying any changes in the output value of said sensor.

63. A machine as claimed in claim 48, and further comprising a user interface device connected to the automatic machine for displaying a state or time development of at least one reference quantity relative to the test operating member.

64. A machine as claimed in claim 63, wherein said user interface device is able to display an output torque value, an angular position value, a speed value and a tracking error value, when said test operating member is an electric motor.

65. A machine as claimed in claim 63, wherein said user interface device is able to display the state, when said test operating member is a solenoid valve.

66. A machine as claimed in claim 63, wherein said user interface device is able to display an output value, when said test operating member is a sensor.

67. A machine as claimed in claim 48, wherein a user interface device is able to display a synoptic image of the automatic machine; icons representing at least some operating members being displayed on said synoptic image to permit user selection of said test operating member.

68. A machine as claimed in claim 67, wherein each said icon is displayed on said synoptic image at the actual location of the respective operating member.

69. A machine as claimed in claim 67, wherein the type of operating members for display in conjunction with said synoptic image is user-selectable.

70. A machine as claimed in claim 48, wherein said second control means is able to activate at least some of said test operating members in a given section of the automatic machine substantially independently of other said operating members in the same section of the automatic machine.

71. An automatic machine for processing cigarettes, the automatic machine comprising a number of operating members, and first control means for setting the automatic machine to an operating condition wherein the operating members are activated coordinatedly to process the cigarettes, or to a machine stop condition wherein substantially each operating member is deactivated in a respective rest condition; the machine further comprising second control means for activating at least one said operating member as a test operating member as of the respective rest condition and substantially independently of other of said operating members; said second control means being able to activate said test operating member to an operating pattern user-selectable by means of a user interface device connected to the automatic machine.

72. A machine as claimed in claim 71, wherein the second control means provides for memorizing said rest condition of said test operating member before activating the test operating member; and for restoring the test operating member to the respective rest condition following activation.

73. A machine as claimed in claim 71, and further comprising a control unit, and an interface device allowing an operator to interact with the control unit; the control unit comprising a control program implementing said first and said second control means.

74. A machine as claimed in claim 71, wherein said second control means provides for activating at least some of said test operating members in a given section of the automatic machine substantially independently of other of said operating members in the same section of the automatic machine.

75. A machine as claimed in claim 74, wherein said second control means is able to memorize said rest condition of the test operating member before activating the test operating member, and to restore the test operating member to the respective rest condition following activation.

76. A machine as claimed in claim 71, wherein said second control means is able to disable individual activation of said test operating member in the event individual activation may interfere with other of said operating members.

77. A machine as claimed in claim 76, wherein said second control means is able to activate the operating members interfering with individual activation of said test operating member in such a manner as to set such operating members to a temporary position involving no interference with individual activation of said test operating member.

78. A machine as claimed in claim 77, wherein said second control means is able to memorize said rest condition of each said operating member interfering with said test operating member; and restoring each said operating member to the respective rest condition following said activation of a test operating member.

79. A machine as claimed in claim 71, wherein said second control means is able to determine, prior to individually activating the test operating member, whether activation of said test operating member may interfere with other of said operating members.

80. A machine as claimed in claim 71, wherein a direction, a stage and/or a performance speed of said operating pattern are user-selectable by means of said user interface device.

81. A machine as claimed in claim 71, wherein a performance speed of said operating pattern is user-selectable by means of a manually operated potentiometer.

82. A machine as claimed in claim 71, wherein said operating pattern is the same as the operating pattern of said test operating member during normal operation of the automatic machine.

83. A machine as claimed in claim 71, wherein said operating pattern provides for setting and maintaining said test operating member in a given condition.

84. A machine as claimed in claim 71, wherein said operating pattern provides for setting said test operating member to a read condition when said test operating member is a sensor.

85. A machine as claimed in claim 84, further comprising means for memorizing and displaying any changes in the output value of said sensor.

86. A machine as claimed in claim 71, and further comprising a user interface device connected to the automatic machine for displaying the state or time development of at least one reference quantity relative to a test operating member.

87. A machine as claimed in claim 86, wherein said user interface device is able to display an output torque value, an angular position value, a speed value and a tracking error value, when said test operating member is an electric motor.

88. A machine as claimed in claim 86, wherein said user interface device is able to display the state, when said test operating member is a solenoid valve.

89. A machine as claimed in claim 86, wherein said user interface device is able to display an output value, when said test operating member is a sensor.

90. A machine as claimed in claim 71, wherein a user interface device is able to display a synoptic image of the automatic machine; icons representing at least some operating members being displayed on said synoptic image to permit user selection of said test operating member.

91. A machine as claimed in claim 90, wherein each said icon is displayed on said synoptic image at the actual location of the respective operating member.

92. A machine as claimed in claim 90, wherein the type of operating members for display in conjunction with said synoptic image is user-selectable.

93. A machine as claimed in claim 71, wherein said second control means is able to activate at least some of said test operating members in a given section of the automatic machine substantially independently of other of said operating members in the same section of the automatic machine.

* * * * *